March 23, 1926.
W. H. PAULL
1,578,090
TIRE AND RIM
Filed Sept. 5, 1925
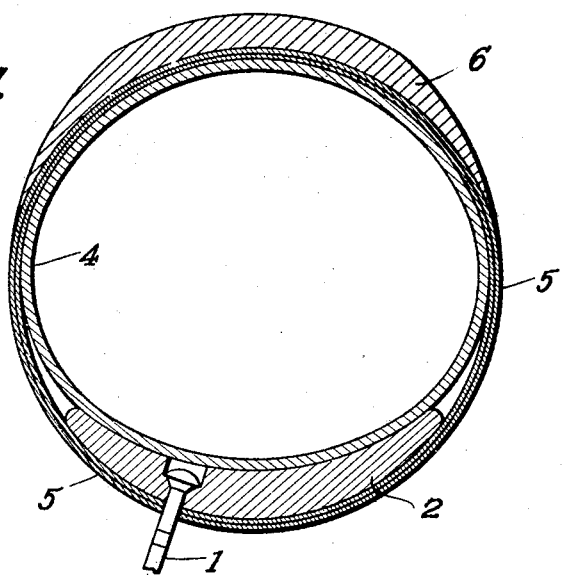
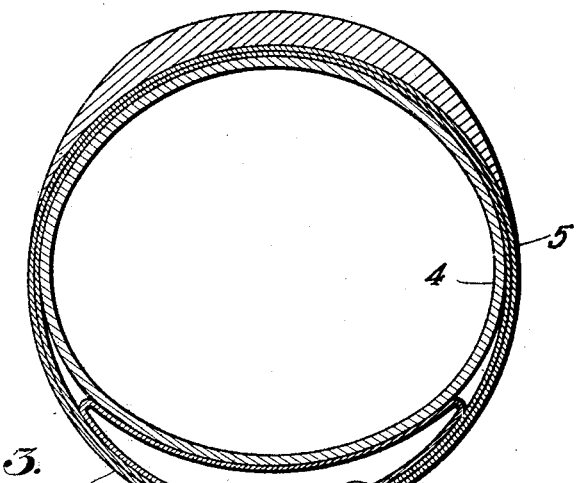
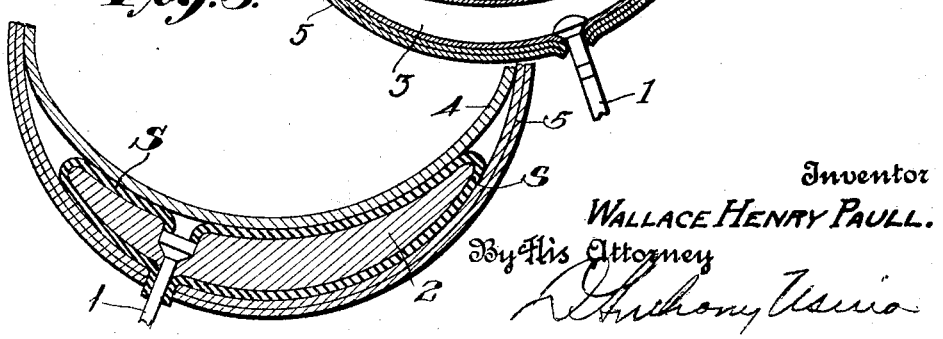
Inventor
WALLACE HENRY PAULL.
By His Attorney Patented Mar. 23, 1926.

1,578,090

UNITED STATES PATENT OFFICE.

WALLACE HENRY PAULL, OF BIRMINGHAM, ENGLAND, ASSIGNOR TO DUNLOP TIRE AND RUBBER CORPORATION OF AMERICA, OF BUFFALO, NEW YORK, A CORPORATION OF NEW YORK.

TIRE AND RIM.

Application filed September 5, 1925. Serial No. 54,602.

*To all whom it may concern:*

Be it known that I, WALLACE HENRY PAULL, a subject of the King of Great Britain, residing in Birmingham, county of Warwick, England, have invented certain new and useful Improvements in Tires and Rims, of which the following is a specification.

This invention relates to tires and rims and comprises improvements in the method of manufacture and the construction thereof and in their attachment to the wheels of vehicles. The invention is specially applicable when it is desired to provide tires and rims of particularly light construction, as for example, for use upon motor cars and motor-cycles for racing purposes.

According to this invention I provide a suitable light wheel, preferably of the wire spoked variety, with a rim of crescent section, upon the outer periphery of which I attach a suitable air tube, and I surround the rim and air tube with suitable cord fabric.

In the accompanying drawings I have shown a form in which my invention may be conveniently and advantageously carried into practice, in which—

Fig. 1 is a view in cross-section of a tire of my improved construction attached to a solid rim of crescent section showing one of the spokes of a wire spoked wheel secured to the rim and the tube and rim surrounded by two or more plies of suitable cord fabric.

Fig. 2 is a view in cross-section showing the application of our improved tire to a rim of hollow crescent section and the fixture of the spokes thereto.

Fig. 3 is a view of a slight modification.

As illustrated the suitable light wheel is of the wire spoked variety. The spokes 1 are secured to the rim in any convenient manner. The said rim may be formed from a single strip of crescent section metal, from a hollow section, from an aluminum casting, or from a wood or other suitable structure. In Fig. 1 I have shown a solid rim 2 and in Fig. 2 a hollow rim 3 both of crescent section.

To the outer periphery of a wheel so constructed I fit a suitable air tube 4 of uncured or semi-cured rubber and around the said air tube 4 and the rim 2 or 3 I wind suitable cord material 5. Such material may be in the form of a single cord or it may be in the form of suitable strips of cord fabric with or without weft. I prefer that the winding shall consist of two plies of cord material wound spirally around the rim and air tube in opposite directions but when necessary additional plies of cord fabric may be used, and they may be applied either separately or two or more plies together.

In the latter case the plies which are applied together are so disposed that the cords therein will run in the same direction.

After completing the spiral winding of cord 5 the ends are suitably secured by lapping on the back of the rim. A suitable rubber tread 6 is applied in any convenient known manner either with or without suitable side walls of rubber as may be desired, when the whole may be placed in a suitable mould the tube inflated and the complete tire then vulcanized.

Instead of vulcanizing the tire in a mold, the uncured tire and wheel may be wrapped and the tire vulcanized under pressure caused by the inflation of the inner tube.

Suitable rubber protecting strips as shown at 8 in Fig. 3 may be placed between the tube and the plies of cord and at the edges of the rim and over the ends of the spoke holes adjacent to the tube.

To facilitate the spoking of the wheel the rim may be first drilled and the nipples and washers placed in position in the rim before the tire is built up thereon, the small ends of the nipples being pushed through the cord fabric between the strands thereof as the plies are wound around the back of the rim.

Alternately the tire may be built on the wheel after spoking, in which case the width of the strip of cord fabric used is such that it can pass between the spokes at the back of the rim.

In some cases we may find it convenient or advantageous to use narrow strips or tapes made of cord or other suitable material.

Having now particularly described and ascertained the nature of my said invention and what manner the same is to be performed, I declare that what I claim is:—

1. A vehicle wheel comprising an annular rim of substantially crescent shape in cross-section, an inflatable tube seated on the rim and an outer cover of flexible fabric embracing the rim and tube.

2. A vehicle wheel including a rim of substantially crescent shape in cross-section, spokes secured to said rim and a covering embracing both the rim and the tube.

3. A vehicle wheel including in combination a rim whose outer periphery in cross-section presents a concave surface, a tube seated in the concavity of the rim; and an outer cover vulcanized to and enclosing both the tube and the rim, said cover consisting of a number of spirally disposed plies of flexible fabric.

4. A tire according to claim 1 having a supplemental tread secured thereto.

5. A vehicle wheel including in combination a rim, an inflatable tube, a covering of flexible fabric embracing both the tube and the rim and protecting strips between said inflatable tube and said flexible covering.

In witness whereof, I have hereunto signed my name.

WALLACE HENRY PAULL.